United States Patent [19]

Mabee

[11] Patent Number: 5,242,039

[45] Date of Patent: * Sep. 7, 1993

[54] ELECTRICALLY ACTUATED TWO-SPEED DRIVE

[75] Inventor: Brian D. Mabee, Sterling Heights, Mich.

[73] Assignee: Easom Engineering and Manufacturing Corporation, Clinton Township, Mich.

[*] Notice: The portion of the term of this patent subsequent to Dec. 22, 2009 has been disclaimed.

[21] Appl. No.: 846,546

[22] Filed: Mar. 5, 1992

[51] Int. Cl.⁵ .................. F16H 37/06; F16D 67/06
[52] U.S. Cl. .................. 192/0.02 R; 192/0.094; 192/0.098; 192/18 B; 192/70.19; 192/70.28; 192/90; 74/625; 74/661; 188/72.3; 188/156; 188/171
[58] Field of Search ........... 192/0.02 R, 0.072, 0.094, 192/0.098, 1.39, 18 R, 18 A, 18 B, 70.19, 70.2, 70.28, 90; 74/661, 625; 188/156, 171, 72.3

[56] References Cited

U.S. PATENT DOCUMENTS

| | | | |
|---|---|---|---|
| 987,954 | 3/1911 | Brush | 192/70.2 |
| 3,270,265 | 8/1966 | McNulty | 192/1.39 X |
| 3,412,834 | 11/1968 | Root | 192/70.19 X |
| 4,125,178 | 11/1978 | Monks | 192/18 A |
| 4,181,201 | 1/1980 | McCarthy | 188/171 |
| 4,352,415 | 10/1982 | Powell | 188/156 |
| 4,458,794 | 7/1984 | Yater | 192/18 A |
| 4,463,841 | 8/1984 | Kelley | 192/18 A |
| 4,577,738 | 3/1986 | Yater | 192/18 A |
| 4,607,736 | 8/1986 | Kelley | 192/18 A |
| 4,676,356 | 6/1987 | Beccaris et al. | 192/70.28 |
| 4,739,865 | 4/1988 | Yater et al. | 192/18 A |
| 4,765,448 | 8/1988 | Sommer | 192/18 A |
| 4,821,847 | 4/1989 | Langdon et al. | 188/171 |
| 4,921,078 | 5/1990 | Sommer | 188/171 |
| 4,938,321 | 7/1990 | Kelley et al. | 188/171 |
| 5,172,798 | 12/1992 | Mabee | 192/18 B |

FOREIGN PATENT DOCUMENTS 173553 12/1960 Sweden ............... 188/171

OTHER PUBLICATIONS

Warner "Clutches, Brakes and Controls Master Catalog", Dated before Jan. 1, 1992 of Warner Electric Division of Dana Corporation.

Oil Shear Electric Brake Brochure of Force Control Ind., Inc., p. 3, Dated before Jan. 1, 1992.

Spiral Retaining Rings Catalog of Smalley Steel Ring Co., pp. 34 & 35, dated before Jan. 1, 1992.

Service Manual of Two Speed Drive II of Force Control Ind., Inc., pp. 1-4, dated Apr. 1991.

Primary Examiner—Richard M. Lorence
Attorney, Agent, or Firm—Peter D. Keefe

[57] ABSTRACT

A two-speed drive utilizing an electromagnetically operated control system wired with respective drive motors, automatically braked in the event of a loss of power, provided with pre-assembled clutch and brake disc stacks, and provided with a manual over-ride. A primary drive motor is connected at one end to an external drive shaft and at an opposite end to a primary clutch drive shaft. The primary clutch drive shaft is connected with a first set of discs of an oil shear clutch disk stack. A secondary clutch drive shaft is connected with a second set of discs of the clutch disk stack. The clutch disc stack is biased by springs to be in a normally clamped mode which is released by a clutch electromagnetic coil assembly. The secondary clutch drive shaft is connected by a gear reducer to a shaft which is connected at one end to a secondary drive motor, and at the other end to a first set of discs of an oil shear brake disk stack. A second set of discs of the brake disk stack is connected to a housing component. The brake disc stack is biased by springs to be in a normally clamped mode, which is released by operation of a brake electromagnetic coil assembly. The clutch and brake disc stacks are pre-assembled and held in a pre-aligned orientation by a plurality of alignment pins and wave washers carried on the alignment pins. A manual over-ride is provided which permits selective release of spring biasing with respect to the brake disc stack so that a manual crank may be operated.

11 Claims, 4 Drawing Sheets

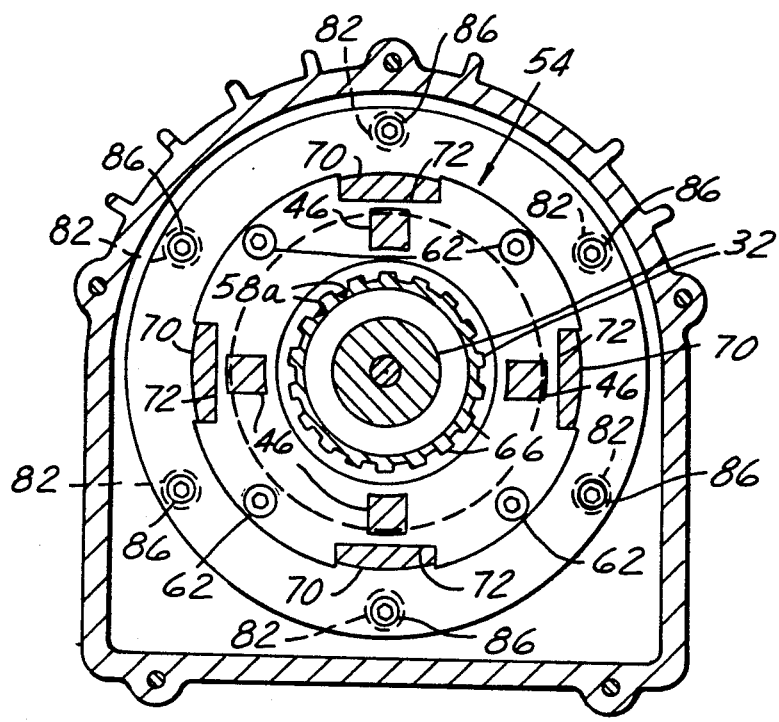
FIG.3
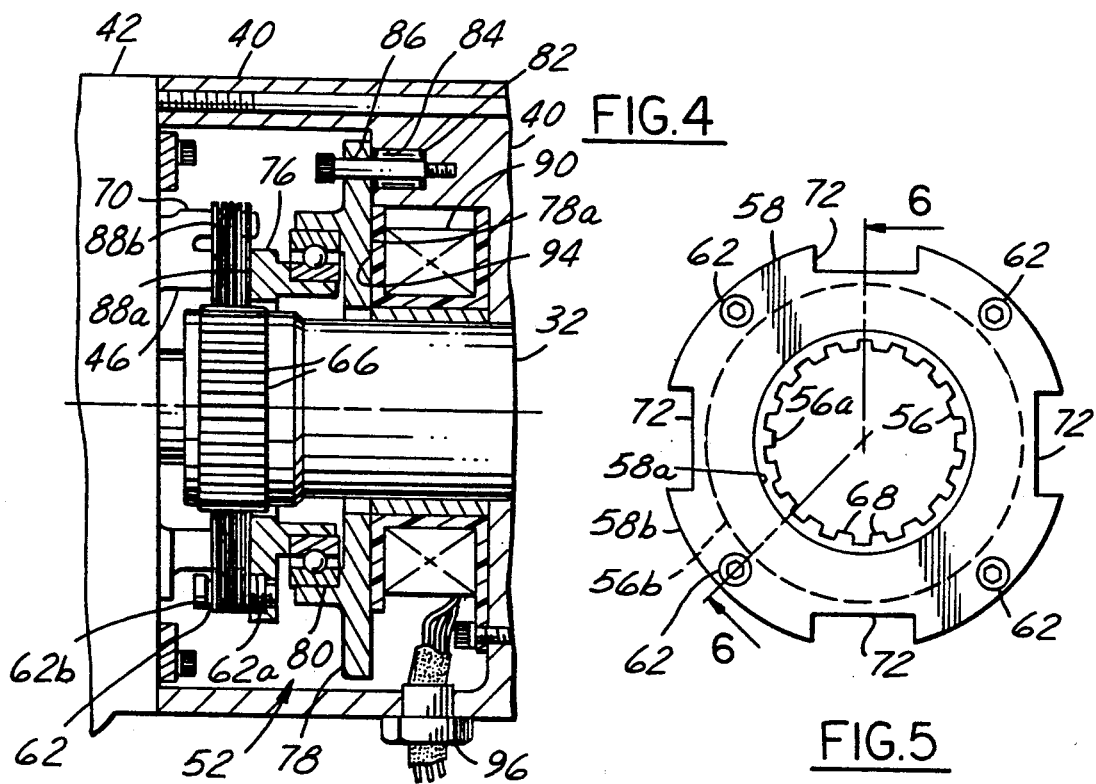
FIG.4
FIG.5

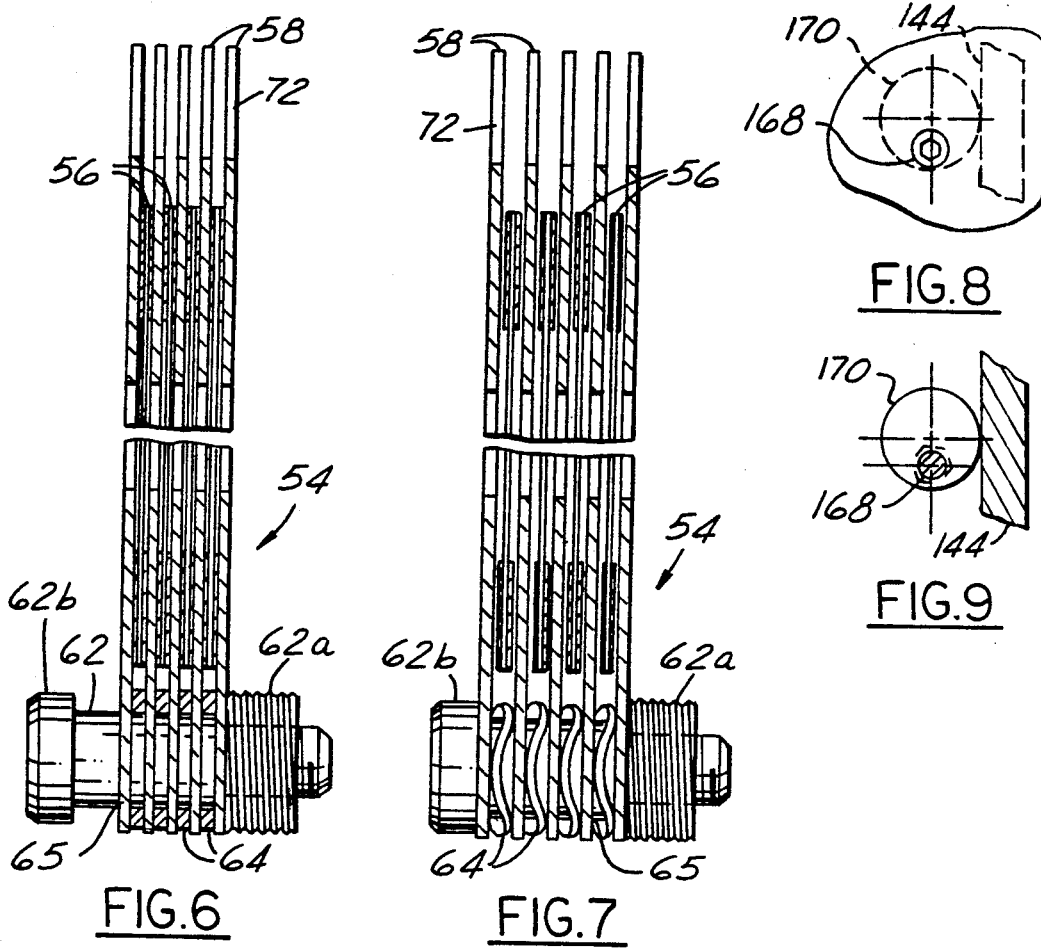

ELECTRICALLY ACTUATED TWO-SPEED DRIVE

BACKGROUND OF THE INVENTION

1. Field of the Invention

The present invention relates to drives for moving tooling and other loads which are normally present in manufacturing environments, and more particularly to two-speed drives incorporating brake and clutch mechanisms which selectively interface with high and low speed electric motors. Still more particularly, the present invention relates to a two-speed drive which incorporates magnetically actuated clutching and braking functions in association with oil shear disc stacks, the disc stacks being uniquely pre-assembled via a plurality of circumferentially spaced alignment pins.

2. Description of the Prior Art

Movement of tools and other machinery in manufacturing environments is facilitated by drives which permit both rapid movement and slow movement, coupled with a brake function. Such drives permit rapid job cycling with accurate load positioning, while providing a maximum expected operational life of the drive. Typically, such drives interface with position locating apparatus which convert rotation into translation, such as by a ballscrew apparatus. Drives of this type incorporate two electric motors: a primary drive motor used for rapid movement and a secondary drive motor coupled through a gear reduction unit used for slow movement. These drives further incorporate a brake for precisely stopping movement and a clutch for selectively engaging the primary and secondary drive motors. The clutch is structured in the form of interleaved annular discs of two annular disc sets which collectively form a stack, in which one set of annular discs is attached to a shaft connected with the secondary drive motor, while the other set of annular discs is attached to a shaft connected with the primary drive motor, and a mechanism is used to selectively control clamping pressure between adjacent annular discs. The brake is structured analogously to the clutch, except that one annular disc set is attached to a stationary housing component.

The disc stacks utilized in the brake and clutch rely upon transmission of torque from one set of annular discs to the other set of annular discs. Some systems rely upon dry frictional engagement between adjacent annular discs to provide torque transfer, this is ordinarily considered unacceptable because of excessive wear and tendency for the dry friction material coating the annular discs to inconsistently rub relative to each other, resulting in a "stick-slip" jerking action which makes accurate positioning almost impossible to achieve. Systems which rely on dry frictional engagement between the annular disc sets generally are those which utilize low clamping force actuation systems, such as those which are electromagnetically operated. Accordingly, most conventional systems rely upon disc stacks utilizing an oil shear principle, in which adjacent annular discs brought into proximity by a clamping actuator, such as a pneumatic device, mutually transmit torque by a thin film of oil therebetween due to viscous shear of the oil film. The oil serves to reduce annular disc wear, provides consistent force transmission and conducts away waste heat. Accordingly, oil shear operated disc stacks have become industry standard, although there is involved a high degree of cost and installation complexity.

An example of a conventional two-seed drive is described in U.S. Pat. No. 4,463,841 to Kelley, dated Aug. 7, 1984. In this drive, a secondary electric motor drives through a gear reducer to an input shaft which connects with a clutch. The clutch is composed of an oil shear operated disc stack, in which one annular disc set is connected with the input shaft and the other annular disc set, interleaved with the first annular disc set, is connected with an output shaft. The output shaft connects with a primary electric motor, which, in turn, provides an output shaft for the drive. The output shaft interfaces with a brake composed of a second oil shear operated disc stack, in which one annular disc set is connected with the output shaft and the other annular disc set, interleaved with the first, is connected with the housing. A pneumatically operated bi-directional piston is axially moved to selectively apply annular disc clamping pressure to either the clutch disc stack or the brake disc stack. In the former mode, the secondary electric motor is able to drive the output shaft, while in the latter mode, rotation of the output shaft is braked. In the neutral position of the bi-directional piston, the brake is off, the secondary electric motor unconnected, and the primary electric motor is used as the prime mover. Selective movement of the bi-directional piston in concert with selective actuation of the electric motors enables an operator to achieve rapid and precise relocation of a load.

While the drive described in U.S. Pat. No. 4,463,841 operates acceptably in many situations, it has several significant problems which have been only partly addressed in the prior art.

One problem is that in the event of a power or fluid pressure failure, it is possible for the drive to continue spinning without the benefit of a brake. This problem was at least partly solved by a drive described in U.S. Pat. No. 4,607,736 to Kelley, dated Aug. 26, 1986, in which the brake stack is clamped by biasing action of springs on the bi-directional piston, and which biasing action is overcome as long as fluid pressure is maintained in the pneumatic lines. The solution pertains, accordingly, only to pressurized fluid operated brake systems.

Another problem is that an external supply of pressurized fluid must be provided to actuate the bi-directional piston. This problem was solved by a drive described in U.S. Pat. No. 4,739,865 to Yater et al, dated Apr. 26, 1988, which discloses a drive incorporating clutch and brake components as generally described above and further incorporating a self-contained hydraulic pump system for actuating the bi-directional piston that controls clamping of the disc stacks. Accordingly, this drive eliminates the need for an external pressurized fluid source. However, this drive has the added costs of an internally provided pressurized fluid source, and it is not suited for use in two speed drives as it requires a motor to be running at the input shaft in order to actuate the bi-directional piston.

What remains needed in the art is a two-speed drive which does not utilize an expensive pressurized fluid control system, is safe in the event of a loss of power, is provided with clutch and brake disc stacks which are not subject to installation complexity, and is provided with a manual over-ride which allows for manual operation.

SUMMARY OF THE INVENTION

The present invention is a two-speed drive which utilizes an electromagnetically operated control system which is wired with the respective drive motors, is automatically braked in the event of a loss of power, is provided with clutch and brake disc stacks which are pre-assembled, and is provided with a manual over-ride which allows for manual operation.

The two-speed drive according to the present invention includes a primary drive motor which is connected at one end to an external drive shaft and at an opposite end to a primary clutch shaft. The primary clutch shaft is connected with a first set of annular discs of an oil shear clutch disk stack. A secondary clutch shaft is connected with a second set of annular discs of the clutch disk stack. The clutch disc stack is biased by sprigs so as to be in a clamped mode, which is released by operation of a clutch electromagnetic coil assembly. The secondary input shaft is connected through a gear reduction unit to a primary input shaft that is connected at one end to a secondary drive motor and at the other end to a first set of annular discs of an oil shear brake disk stack. A second set of annular discs of the brake disk stack is connected to a stationary housing component. The brake disc stack is biased by springs so as to be in a clamped mode, which is released by operation of a brake electromagnetic coil assembly. The clutch and brake disc stacks are pre-assembled and held in a pre-aligned orientation by operation of a plurality of alignment pins and wave washers carried on the alignment pins. A manual over-ride is provided adjacent the brake electromagnetic coil assembly which permits selective release of spring biasing with respect to the brake disc stack so that a manual crank may be operated.

High speed positioning is accomplished by energization of the primary drive motor as well as energization of a primary electromagnetic coil of the clutch electromagnetic coil assembly. Braking is achieved by de-energizing the primary drive motor and the primary electromagnetic coil. Low speed positioning is accomplished by energization of the secondary drive motor (while the primary drive motor and primary electromagnetic coil are de-energized) and energization of a secondary electromagnetic coil of the brake electromagnetic coil assembly. Braking is achieved by de-energizing the secondary drive motor and the secondary electromagnetic coil.

Accordingly, it is an object of the present invention to provide a two-speed drive having a clutch and a brake each of which incorporate spring biased disc stacks which are respectively selectively disengaged by electromagnetic coil assemblies.

It is an additional object of the present invention to provide a two-speed drive having a clutch and a brake each of which incorporate spring biased disc stacks, in which each disc stack is pre-assembled as a unit for providing easy and precise installation.

It is another object of the present invention to provide a two-speed drive having a clutch and a brake each of which incorporate spring biased disc stacks which are respectively selectively disengaged by electromagnetic coil assemblies, in which in the event of a power failure, the clutch and brake are both actuated by the spring biasing, thereby automatically causing rotation to stop.

It is yet another object of the present invention to provide a two-speed drive having a clutch and a brake each of which incorporate spring biased disc stacks which are respectively selectively disengaged by electromagnetic coil assemblies, in which the brake disc stack may be selectively released from being spring biased so as to permit manual rotation of the two-speed drive.

It is still another object of the present invention to provide a two-speed drive having a primary drive motor, a secondary drive motor, a clutch incorporating a disc stack selectively disengaged by actuation of a clutch electromagnetic coil assembly, and a brake incorporating another disc stack selectively disengaged by actuation of a brake electromagnetic coil assembly, in which actuation of the primary drive motor is necessarily accompanied by actuation of a primary electromagnetic coil of the clutch electromagnetic coil assembly, and further in which actuation of the secondary drive motor is necessarily accompanied by actuation of a secondary electromagnetic coil of the brake electromagnetic coil assembly.

These, and additional objects, advantages, features and benefits of the present invention will become apparent from the following specification.

BRIEF DESCRIPTION OF THE DRAWINGS

FIG. 3 is a partly sectional end view of the two-speed drive according to the present invention, seen along lines 3—3 in FIG. 2 and showing in particular the clutch disc stack.

FIG. 4 is a detail partly sectional side view of the two-speed drive according to the present invention, showing in particular the clutch disc stack from the same vantage as that of FIG. 2.

FIG. 5 is a detail plan view of an annular disc of the clutch disc stack as seen from the vantage as that of FIG. 3.

FIG. 6 is an edge view of the clutch disk stack shown in FIG. 4, seen along lines 6—6 in FIG. 5, in which the clutch disk stack is in a clamped mode.

FIG. 7 is an edge view of the clutch disk stack shown in FIG. 6, now showing the clutch disc stack is in an un-clamped mode.

FIG. 8 is plan view of the manual over-ride assembly, seen along lines 8—8 in FIG. 1.

FIG. 9 is a partly sectional plan view of the manual over-ride assembly, seen along lines 9—9 in FIG. 1.

FIG. 10 is a schematic diagram of electrical functions with respect to actuation of the primary and secondary drive motors and the primary and secondary electromagnetic coils.

DETAILED DESCRIPTION OF THE PREFERRED EMBODIMENT

Figure 1:
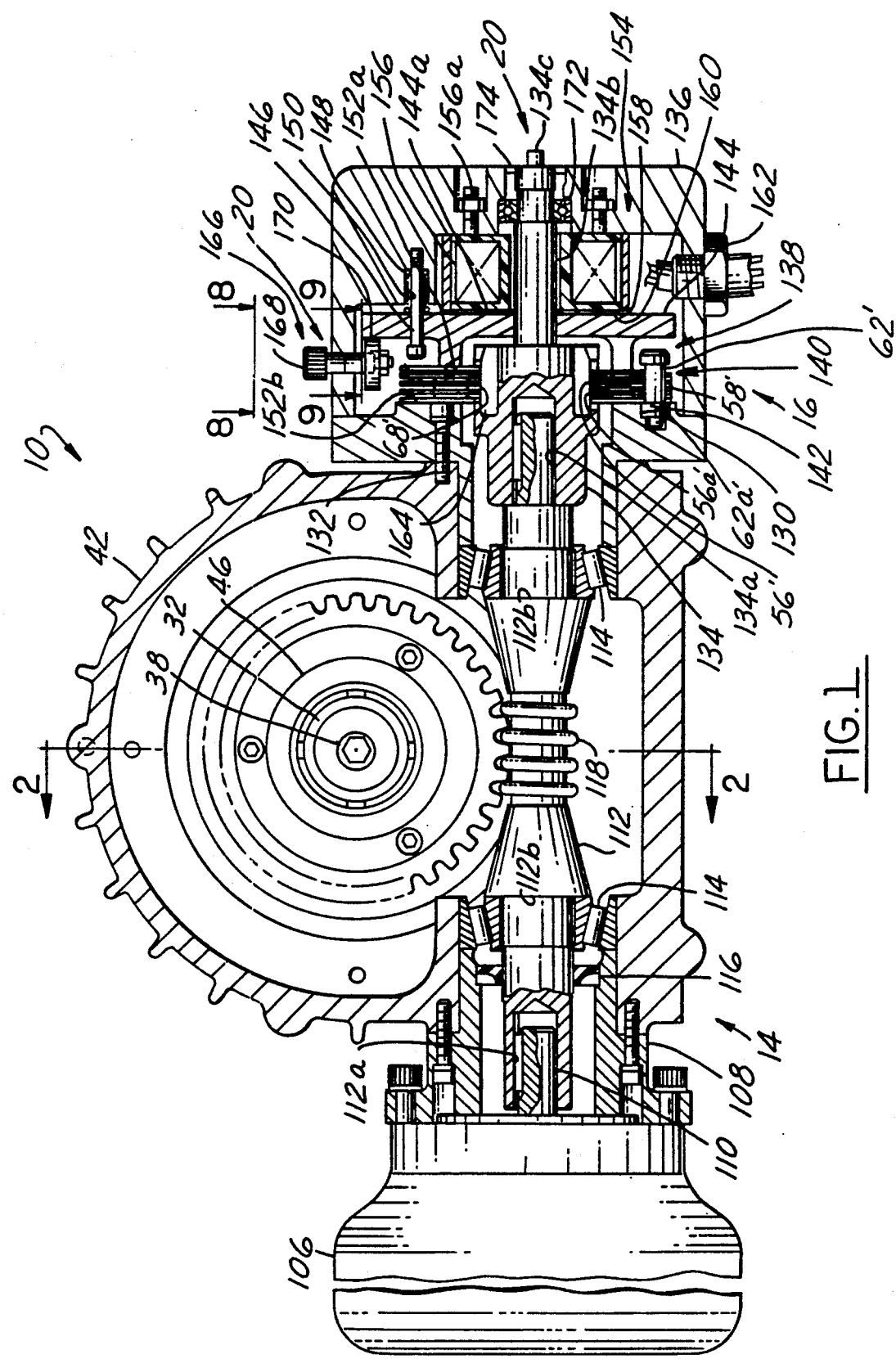
FIG. 1 is a partly sectional end view of the two-speed drive according to the present invention, seen along lines 1—1 in FIG. 2 and showing in particular the secondary drive assembly and the brake assembly.
Figure 2:
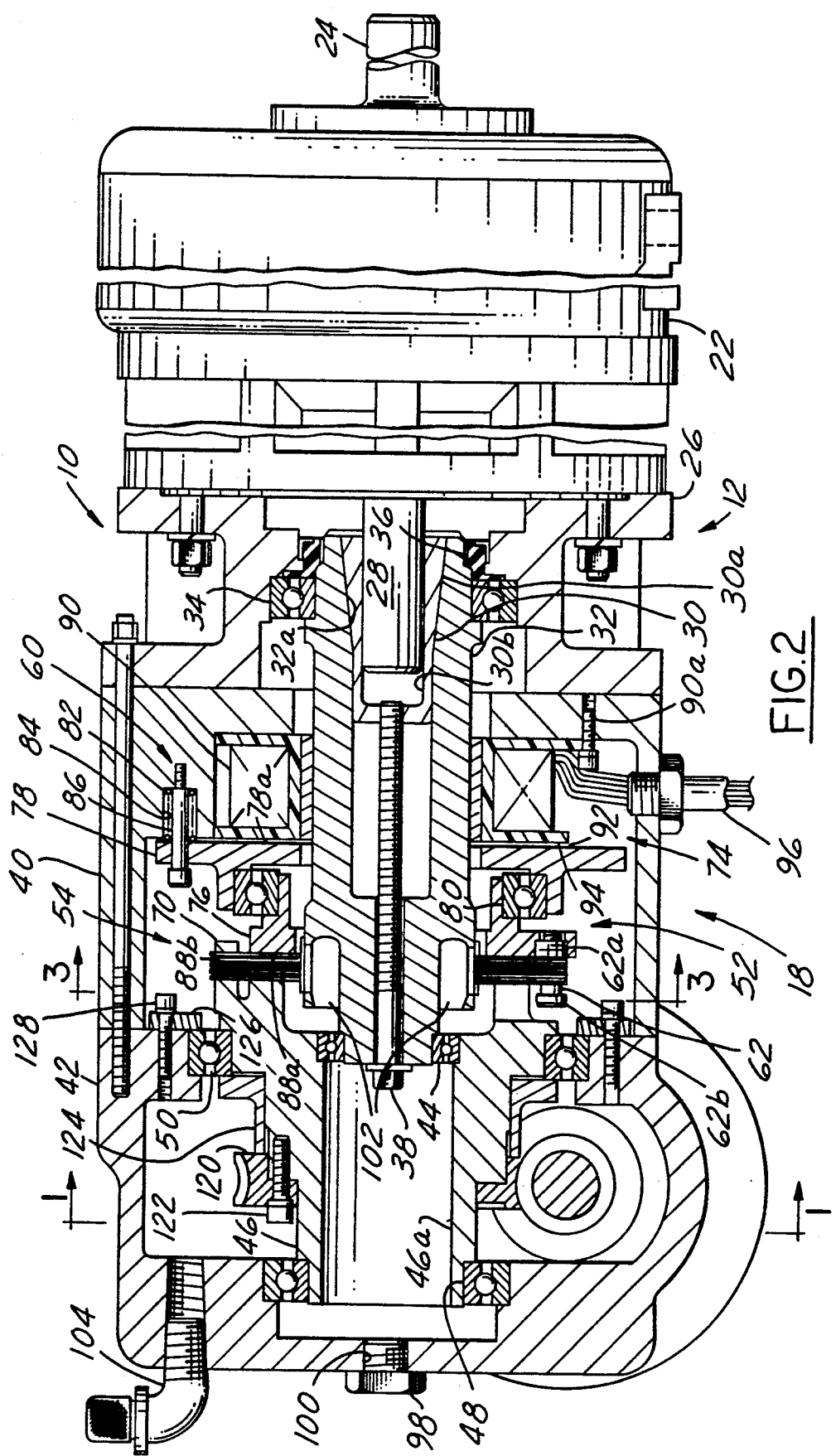
FIG. 2 is a partly sectional side view of the two-speed drive according to the present invention, seen along lines 2—2 in FIG. 1 and showing in particular the primary drive assembly and the clutch assembly.

Referring now to the Drawing, a general over-view of the two-speed drive 10 according to the present invention can be understood with reference being had to FIGS. 1 and 2. The two-speed drive 10 is composed of a primary drive assembly 12 for providing high speed driving, a secondary drive assembly 14 for providing low speed driving, a normally engaged brake assembly 16 for providing controlled stopping, and a normally engaged clutch assembly 18 for providing selective engagement between the secondary drive assembly and the brake assembly with respect to the primary drive assembly. The primary drive assembly 12 directly provides rapid positional movement, with braking achieved by engagement of the clutch assembly 18 and the brake assembly 16. The secondary drive assembly 14 provides slow positional movement driven through the clutch assembly 18, with braking achieved by engagement of the brake assembly 16. Both the clutch assembly 18 and the brake assembly 16 operate on the oil shear principle, and are structured to be actuated selectively by energization of respective electromagnetic coils. The brake assembly 16 is connected with a manual over-ride assembly 20 for providing manual driving for purposes of set-up or in the event of a power failure.

A. The Primary Drive Assembly

The primary drive assembly 12 includes a primary drive motor 22 of a standard electric type preferably three-phase and operating at approximately 1,725 RPM. The primary drive motor 22 has, at one side thereof, an external drive shaft 24 for interfacing with an external position movement apparatus (not shown) such as a ballscrew apparatus. The opposite side of the primary drive motor 22 is fastened to an adapter housing 26 for rigidly securing the primary drive motor with respect to the two-speed drive 10. Energization of the primary drive motor 22 provides direct high speed drive of the position movement apparatus.

B. The Clutch Assembly

The clutch assembly 18 will now be detailed. The opposite end of the primary drive motor is provided with a primary drive shaft 28. A collet 30 having a gently tapered outside surface 30a with slots cut out radially from the center to the outside surface, has an axial bore 30b into which the primary drive shaft 28 press fits. The collet 30 fits into a tapered seat 32a provided in one end of a primary clutch shaft 32. The primary clutch shaft 32 is rotatably mounted with respect to the adapter housing by a first primary clutch shaft bearing 34; adjacent thereto is an oil seal 36 therebetween. A collet bolt 38 extends through the primary clutch shaft 32 from the opposite end thereof and threadably engages with the collet 30. Tightening of the collet bolt 38 results in the collet being drawn into and compressed by the tapered seat 32a, thereby clamping it with respect to the drive shaft 28. Loosening of the collet bolt 38 permits undamaged disassembly.

The adapter housing 26 is connected with a clutch assembly housing 40, which is, in turn, connected with a secondary drive housing 42. The opposite end of the primary clutch shaft 32 is rotatably supported on a second primary clutch shaft bearing 44. The second primary clutch shaft bearing 44 engages an axial bore 46a in a secondary clutch shaft 46, and is useful to provide axial location of the primary clutch shaft 32 so as to facilitate assemblage of the clutch assembly prior to installation of the primary drive motor 22. The secondary clutch shaft 46 is rotatably connected at one end to the secondary drive housing 42 by a radial support bearing 48, and is further connected to the secondary drive housing at an intermediate location by a four point contact bearing 50 which is able to take axial thrust loads generated by clutch springs (which is discussed hereinbelow).

The primary clutch shaft 32 is selectively connected with the secondary clutch shaft 46 through a clutch 52. The clutch 52 operates on the oil shear principle, and is composed of a clutch disc stack 54 having a first set of annular discs 56 which are interleaved with a second set of annular discs 58, the two sets of annular discs being unclamped by selective energization of an electromagnetic coil assembly 60. The annular discs of the clutch disc stack 54 are of a composition, shape and surface finish well known in the art of oil shear torque transfer. The clutch disc stack 54 is pre-assembled using a plurality of axially projecting and circumferentially spaced alignment pins 62. In this regard, the second set of annular discs 58 is provided with a plurality of holes 65 through which the alignment pins pass. The annular discs of each set 56, 58 are alternately stacked. A wave washer 64 is preferred, but not required, to be placed between each of the annular discs of the second set 58. Upon completion of this stacking process, a double threaded nut 62a is threaded onto an end of each of the alignment pins 62; it is preferred for a thread lock adhesive to be used to assure that the double threaded nuts 62a remain permanently threaded at a desired location on the alignment pins 62. Accordingly, both sets of annular discs 56, 58 are trapped between a head 62b at one end of each of the alignment pins 62 and the double threaded nut 62a at the other end of each of the alignment pins.

The clutch disc stack 54 is structured to engage the primary and secondary clutch shafts 32, 46, and the first and second sets of annular discs 56, 58 are respectively axially slidable therewith. In this regard, the primary clutch shaft 32 is provided with splines 66 which engage teeth 68 on the inner periphery 56a of the first set of annular discs 56 (the cross-section of the inner periphery 58a of the second set of annular discs 58 being greater than that of the aforesaid inner periphery 56a, as shown in FIG. 5). In this regard further, the secondary clutch shaft is provided with a plurality of axially oriented lugs 70 which are structured to engage similarly dimensioned notches 72 on the outer periphery 58b of the second set of annular discs 58 (the cross-section of the outer periphery 56b of the first set of annular discs 56 being less than that of the aforesaid outer periphery 58b, as shown also in FIG. 5). See FIGS. 3 through 7, wherein FIGS. 5, 6 and 7 show the general structure of the clutch disc stack and FIGS. 3 and 4 show placement thereof with respect to the primary and secondary clutch shafts 32, 46.

As indicated above, the annular discs composing the clutch disc stack 54 are selectively clamped together to thereby couple the primary clutch shaft 32 with respect to the secondary clutch shaft 46. In this regard, each of the double threaded nuts 62a threadably engage a clutch thrust plate 76. The clutch thrust plate 76, which rotates with the secondary clutch shaft 46, is connected to a non-rotating clutch armature plate 78 via a four-point contact bearing 80. A plurality of clutch springs 82 are seated within clutch spring cavities 84 located in the clutch assembly housing 40. The clutch springs 82 bias against the clutch armature plate 76, causing the clutch thrust plate 76 to bias against the clutch disc stack 54. Axial movement of the clutch armature plate 76 in response to the biasing of the clutch springs 82, is regulated by shoulder bolts 86 which slidably engage the clutch armature plate and emanate anchorably from each of the clutch spring cavities 84. Clamping force between the two sets of annular discs 56, 58 is supplied by the biasing action of the clutch springs 82 evenly pressing a first thrust surface 88a on the clutch thrust plate 76 toward a second thrust surface 88b on the secondary clutch shaft 46.

Normally, the two sets of annular discs 56, 58 are clamped together by the biasing of the clutch springs 82. Accordingly, normally the secondary clutch shaft 46 is engaged with respect to the primary clutch shaft 32. In order that this engagement be user selectable, a clutch electromagnetic coil assembly 60 is provided. The clutch electromagnetic coil assembly 60 is composed of a primary electromagnetic coil 90 which is axially located within and connected by mounting bolts 90a to the clutch assembly housing 40 so that the clutch assembly housing serves as a heat sink for the primary electromagnetic coil. A working air gap 92 is provided between the pole 94 of primary electromagnetic coil 90 and a coil face portion 78a of the clutch armature plate 78, which is constructed of a magnetic material. Upon energization of the primary electromagnetic coil 90, the clutch armature plate 78 is magnetically attracted thereto and moves axially toward the pole 94, the biasing force of the clutch springs being overcome. Since the four-point contact bearing 80 and the clutch thrust plate 76 move with the clutch armature plate 78, the clamping force being applied tot he clutch disc stack 54 by the clutch springs 82 is relieved. Accordingly, the secondary clutch shaft 46 becomes disengaged form the primary clutch shaft 32. In this respect, the working gap 94 and the necessary amount of inter-disc distance are predetermined so that the two sets of annular discs 56, 58 are rotatively independent when the primary electromagnetic coil 90 is energized. An electric feed through 96 is provided through the clutch assembly housing 40 to provide connection of the primary electromagnetic coil 90 to a source of electricity.

Oil is filled within clutch assembly 18 via a removable threaded filler-sight cap 98 which threads into a filler hole 100 through the secondary drive housing 42, and located in axial alignment with the primary clutch shaft 32. Oil is filled through the filler hole 100 with the clutch assembly 18 in tilted orientation. Oil level is indicated through a sight in the filler/sight cap 98. In order to ensure proper oil flow between the annular discs of the clutch disc stack 54, a centrifugal oil pump 102 is provided on the primary clutch shaft 32 adjacent the splines 66. A breather 104 is provided in the secondary drive housing 42 for keeping atmospheric pressure within the clutch assembly 18; excessive pressure can leas to oil seal failure, and therefore is to be avoided. Oil is circulated around the primary electromagnetic coil 90 to assist heat dissipation. Due to the use of oil, throughout the two-speed drive 10, oil seals and gaskets between housing components are utilized to prevent oil leaks.

The clutch disc stack 54 and the clutch assembly 18 according to the present invention have a number of significant advantages.

First, pre-assembly of the disk stack by operation of the alignment pins 62 assures a proper order of the annular discs and maintenance of predetermined tolerances. Tolerances are critical to maintain so that the working air gap 92 is minimized; accordingly disc order is also critical to allowing the clutch disc stack 54 to be held as tightly as possible. A more tightly held disc stack results in a minimization of the clutch electromagnetic coil assembly 60, as the force exerted by the primary electromagnetic coil 90 on the clutch armature plate 78 is inversely proportional to the square of the distance the clutch armature plate must travel.

Second, assemblage is simplified and made much less susceptible to error. Assembly of the clutch 52 is performed by sipping the teeth 68 of the first set of annular discs 56 on the splines 66 of the primary clutch shaft 32. Upon completion, the double threaded nuts 62a are threaded into the clutch thrust plate 76. Next, the secondary clutch shaft 46 is located with the lugs 70 engaging the notches 72 on the second set of annular discs 58; in this regard, the first clutch thrust surface 88a is useful to help alignment of the annular discs. The shoulder bolts 86 capture the clutch armature plate 78, clutch thrust plate 76, the four point contact bearing 80 and the clutch springs 82, so that these can be assembled as a sub-assembly.

Third, the alignment pins 62 permit the use of the wave washers 64 between each of the annular discs of the first set of annular discs 56. The wave washers are important to help reduce adjacent annular disc dragging caused by surface tension of the oil. Further, the wave washers help to ensure even wear across adjacent surfaces of the annular discs.

Torque transfer between the two sets of annular discs 56, 58 can be varied per particular application of the two speed drive 10 by providing clutch springs 82 having a certain preselected spring constant. Further, the clutch disc stack 54 may be configured differently, such as by two or more annular discs being differently ordered; that is, two or more annular discs of the same set being mutually adjacent.

C. The Secondary Drive Assembly

The secondary drive assembly 18 includes a secondary drive motor 106 connected to a C-face adapter 108, the C-face adapter being connected with the secondary drive housing 52. The secondary drive motor 106 is preferred to be a three phase electric motor, and may have the same ratings as the primary drive motor 22; typically, however, the secondary drive motor will have a lower horsepower rating than the primary drive motor. A secondary drive shaft 110 of the secondary drive motor 106 is keyed to engage with a keywayed bore 112a of a worm shaft 112. The worm shaft 112 is rotatably supported with respect to the secondary drive housing 42 by a pair of support bearings 114 which axially affix the worm shaft. An oil seal 116 is located between the secondary drive shaft 110 and the C-face adapter 108. The worm shaft 112, at an intermediate position between the support bearings 114, is provided with a spiral worm 118.

A worm gear 120 is connected to the secondary clutch shaft 46 at an intermediate position between the radial support bearing 48 and the four point support bearing 50 by a plurality of worm gear bolts 122 and reamed dowls. A spacer ring 124, which axially affixes the four point support bearing 50, is clamped by the worm gear 120. The worm gear 120, the spacer ring 124, the bearings 48, 50, and the secondary clutch shaft 46 are captured by a retainer ring 126 via a plurality of ring bolts 128; accordingly, these components may be assembled as a sub-assembly. The worm gear 120 gearably engages the worm 118 so that energization of the secondary drive motor 106 results in the worm driving the secondary clutch shaft 46.

D. The Brake Assembly

The brake assembly 16 includes a brake mounting plate 130 which is connected to the secondary drive housing 42 by a plurality of bolts 132. The support bearings 114 are axially trapped by respectively adjacent shoulders 112b on the worm shaft 112 in combination with the C-face adapter 108 and the brake mounting plate 130. The worm shaft 112, opposite the secondary drive motor 106, is keyed for engagement with a keywayed bore 134a of a brake hub 134. A brake housing 136 is connected with the brake mounting plate 130.

The worm shaft 112 is selectively stopped through operation of a brake 138 connected with the worm shaft 122 and the stationary housing components o the two-speed drive 10. As in the clutch 52, the brake 138 operates on the oil shear principle, and is composed of a brake disc stack 140 having the specifications detailed hereinabove with respect to the clutch disc stack 54. Accordingly, for the sake of brevity, the same numerals with a prime are used to show like functioning components as between the clutch disc stack 54 and the brake disc stack 140. In this regard, it is important to note that the brake disc stack 140 is also pre-assembled using a plurality of axially projecting and circumferentially spaced alignment pins 62'.

The brake disc stack 140 is structured to engage the worm shaft 112 and the non-rotating housing components, namely the brake mounting plate 130, and the first and second sets of annular discs 56', 58' are respectively axially slidable therewith. In this regard, the brake hub 134 is provided with splines which engage teeth 68' on the inner periphery 56a' of the first set of annular discs 56'. In this regard further, the brake mounting plate 130 is provided with threaded seats 142 for threadably receiving the double threaded nuts 62a' of the alignment pins 62'. In this way, the second set of annular discs 58' are held rotatively fixed with respect to the brake mounting plate 130.

The brake 138 is actuated by the annular discs composing the brake disc stack 140 being selectively clamped together to thereby couple the worm shaft 112 to the brake mounting plate 130. In this regard, a brake armature plate 144, is slidably supported and guided by a plurality of shoulder bolts 146, analogously as in the clutch 52, which enamate anchorably from brake spring cavities each in the brake housing 136. A brake spring 148 is seated within each of the brake spring cavities 150. The brake springs 148 bias against the brake armature plate 144, causing it to bias against the brake disc stack 140. Clamping force between the two sets of annular discs 56', 58' is supplied by the biasing action of the brake springs 148 evenly pressing a first brake thrust surface 152a on the brake armature plate 144 toward a second brake thrust surface 152b on the brake mounting plate 130.

Normally the two sets of annular discs 56', 58' are clamped together by the biasing of the brake springs 148. Accordingly, normally the worm shaft 112 is engaged with respect to the stationary housing components, via the brake mounting plate 130. In order that this engagement be user selectable, a brake electromagnetic coil assembly 154 is provided. The brake electromagnetic coil assembly 154 is composed of a secondary electromagnetic coil 156 which is axially located within and connected by mounting bolts 156a to the brake housing 136 so that the brake housing serves as a heat sink for the secondary electromagnetic coil. A working air gap 158 is provided between the pole 160 of the secondary electromagnetic coil 156 and a coil face portion 144a of the brake armature plate 144, which is constructed of a magnetic material. Upon energization of the secondary electromagnetic coil 156, the brake armature plate 144 is magnetically attracted thereto and moves axially toward the pole 160, the biasing force of the brake springs 148 being overcome so that the clamping force being applied to the brake disc stack 140 by the brake springs 148 is relieved. Accordingly, the worm shaft 112 becomes disengaged form the brake mounting plate 130. In this respect, the working gap 158 and the necessary amount of inter-disc distance are predetermined so that the two sets of annular discs 56', 58' are rotatively independent when the secondary electromagnetic coil 156 is energized. An electric feed through 162 is provided through the brake housing 136 to provide connection of the secondary electromagnetic coil 156 to a source of electricity. As in the primary electromagnetic coil 90, oil is permitted to circulate about the secondary electromagnetic coil 156 to assist in heat dissipation.

To ensure proper operation of the brake disc stack 140, a centrifugal oil pump 164 is connected with the brake hub 134. As in the clutch disc stack 54, the brake disc stack 140 may be adjusted as described hereinabove to provide a desired torque transference between the two sets of annular discs 56', 58'. The brake 138 is assembled analogously as described with respect to the clutch 52, except in particular that there is no thrust plate and there are no lugs to be interfaced with the brake disc stack. The shoulder bolts 146 capture the brake armature plate 144 and the brake springs 148, so that these may be assembled as a sub-assembly.

E. The Manual Over-ride Assembly

The manual over-ride assembly 20 includes a manual release mechanism 166 which is connected with the brake housing 136. The manual release mechanism is composed of a socket head bolt 168 which passes through the brake housing 136 and has eccentrically mounted thereto a release plate 170 having a rounded contour. The release plate 170 is held fixed to the socket head bolt 168 by two machined flats, and an O-ring is employed to prevent oil leakage out of the brake housing 136. The rounded contour of the release plate 170 contacts the brake armature plate 144. Rotation of the socket head bolt 168 to a first position results in the release plate 170 being disengaged form biasing against the brake armature plate 144. Rotation of the socket head bolt 168 to a second position results in the release plate 170 biasing against the brake armature plate 144 so as to overcome the biasing force of the brake springs 148 and thereby releasing clamping pressure of the brake armature plate 144 on the brake disc stack 140. Accordingly, in this second position of the socket head bolt 168, the worm gear 112 is fred to turn. The second position of rotation of the socket head bolt is preferred to be prevented by a boss from being rotated to a position which the eccentric axis of the release plate 170 is aligned with respect to the socket head bolt and the brake armature plate 144; that is , upon release of turning pressure on the socket head bolt, the force of the brake springs 148 will cause the socket bolt head to automatically rotate back to the first position, and thereby de-activate release of the brake 138.

The over-ride assembly 20 further includes a crank mechanism for permitting manual operation of the two-speed drive 10. In this regard, the brake hub 134 is provided with an extension shaft 134b which has an end 134c which extends out of the brake housing 136. The extension shaft 134b is rotatably supported with respect to the brake housing 136 by bearings 172, and an oil seal 174 therebetween prevents oil leakage. A crank (not shown) is connected with the extension shaft end 134c so that a user, after releasing the brake 138 by use of the manual release mechanism 166, the worm gear 112 may be manually rotated as long as the brake remains released.

F. Operation

Operation of the two-speed drive 10 will now be described, with reference being had particularly to FIG. 10.

To operate the two speed drive 10 in high speed mode, the primary motor and primary electromagnetic coil of the clutch are energized. In this manner, the primary drive motor directly drives an external position movement apparatus with the primary clutch shaft spinning independently of the secondary clutch shaft, since the first and second sets of annular discs of the clutch disc stack are uncoupled. As indicated by numeral 176 in FIG. 10, in the high speed mode the secondary electromagnetic coil would not be energized, nor would the secondary drive motor.

To switch from high speed mode to low speed mode as a predetermined positional location is neared by the external position movement apparatus, the primary drive motor and the primary electromagnetic coil are de-energized, thereby resulting in the two sets of annular discs of the clutch disc stack to be coupled, and thereby engaging the primary clutch shaft with the secondary clutch shaft. As indicated by numeral 178 in FIG. 10, the secondary electromagnetic coil is energized (initially, this may be in a pulsed manner if needed to rapidly reduce speed to match that of the slow speed mode) and the secondary drive motor is energized. Thus, the brake is released by operation of the secondary electromagnetic coil, and the secondary drive motor drives through the worm and worm gear, through the clutch to the output shaft (the primary drive motor turning freely).

To engage the brake, the secondary drive motor and the secondary electromagnetic coil are de-energized, causing the two sets of annular discs of the brake disc stack to couple and thereby stop rotation of the worm shaft, and through the clutch, rotation of the output shaft.

During set-up or in the event of a power failure, the brake may be over-ridden by rotation of the socket head bolt so that the brake armature plate is axially moved so as to relieve spring bias force on the brake disc stack. The crank may now be rotated so as to turn the worm shaft and, through the clutch, the output shaft.

Since the primary and secondary drive motors and the primary and secondary electromagnetic coils all operate from a source of electricity, in the event of a power failure, the clutch and the brake automatically engage, thereby preventing potential operator injury or apparatus damage.

It is preferred for the primary drive motor to be wired so as to be energized only when the primary electromagnetic coil is energized. This can be provided, for example by employing a parallel circuit controlled by a switch that simultaneously energizes both the primary drive motor and the primary electromagnetic coil. This feature ensures that the primary drive motor will operate without interference from any other component of the two-speed drive 10, as the clutch will be always disengaged when the primary drive motor is energized. The secondary drive motor is also preferred to be wired in parallel with respect to the secondary electromagnetic coil and be controlled by a single switch so that the secondary drive motor is simultaneously energized with the secondary electromagnetic coil (thus preventing the brake from actuating when the secondary drive motor is energized). parallel wiring as described has the potential to save much material and labor cost in the installation of the two-speed drive 10, as electrical connections and wiring are minimized.

To those skilled in the art to which this invention appertains, the above described preferred embodiment may be subject to change or modification. For instance, while oil shear operated clutch and brake stacks are preferred, certain installations may be better served by substituting dry friction disc stacks for these components of the two-speed drive 10. In such a case, the Drawing remains effective to fully show this structure, although components to supply and move oil would be dispensed with. More specifically relative to utilization of dry friction type clutch and brake stacks in the two-speed drive 10, the first and second sets of annular discs 56′, 58′ and the alignment pins 62′ have the same structure and interrelationship as indicated in the Drawing. Further in this regard, the electromagnetic actuation system according to the present invention for release of the clutch and brake disc stacks is usable in a two-speed drive whether or not the disc stacks utilized are of a conventional structure or are of the structure specifically disclosed herein by way of the present invention. Such change or modification can be carried out without departing from the scope of the invention, which is intended to be limited only by the scope of the appended claims.

What is claimed is:

1. A two-speed drive, comprising:
a stationary housing;
an output shaft;
primary drive means connected with said stationary housing and said output shaft for providing high speed driving of said output shaft;
secondary drive means connected with said stationary housing for providing low speed driving of said output shaft;
clutch means connected with said primary drive means and said secondary drive means for selectively engaging said secondary drive means to said output shaft, said clutch means comprising:
a primary clutch shaft rotatably mounted to said stationary housing and connected with said primary drive means, said primary clutch shaft being provided with splines;
a secondary clutch shaft rotatably mounted to said stationary housing and connected with said secondary drive means, said secondary clutch shaft being provided with a plurality of lugs oriented parallel with respect to said secondary clutch shaft; wherein said connection of said secondary clutch shaft to said secondary drive means comprises gear reduction means rotatably connected with said stationary housing and drivably connected to said secondary drive means and said secondary clutch shaft for transmitting gear reduced rotation from said secondary drive means to said secondary clutch shaft; and a clutch disk stack comprising:
  a first set of annular disks connected with said primary drive means so as to rotate with said primary drive means and be axially slidable with respect thereto;
  a second set of annular discs interleaved with said first set of annular disks, said second set of annular discs being connected with said secondary drive means so as to rotate with said secondary drive means and be axially slidable with respect thereto; and
  first alignment pin means connected with said second set of annular discs for capturing each annular disc of said second set of annular discs and for capturing each annular disc of said first set of annular discs;
  wherein each annular disc of said first set of annular discs has a first inner periphery and a first outer periphery, wherein further each annular disc of said second set of annular discs has a second inner periphery and a second outer periphery, said first inner periphery having a cross-section less than said second inner periphery, said first inner periphery being provided with a plurality of teeth for engaging said splines of said primary clutch shaft, said first outer periphery having a cross-section less than said second outer periphery, said second outer periphery being provided with a plurality of notches for engaging said plurality of lugs of said secondary clutch shaft; and first biasing means connected with said stationary housing for selectively biasing said first set of annular discs with respect to said second set of annular discs so as to selectively clamp said first set of annular discs with respect to said second set of annular discs, thereby selectively engaging said secondary drive means with respect to said primary drive means, said first biasing means comprising:
  a thrust plate having a first clutch thrust surface for abutably contacting one side of said clutch disc stack;
  a second clutch thrust surface connected with said secondary clutch shaft for abutably contacting a side of said clutch disc stack opposite with respect to said one side thereof;
  a clutch armature plate having a coil face portion constructed of a magnetic material, said clutch armature plate being rotatably connected with said thrust plate for transmitting force on said clutch armature plate axially with respect to said primary clutch shaft to said thrust plate;
  a plurality of clutch springs, said stationary housing being provided with a plurality of clutch spring cavities for locating each clutch spring of said plurality of clutch springs in a respective clutch spring cavity;
  a plurality of shoulder bolts, a shoulder bolt being anchored in each of said clutch spring cavities, said armature plate being slidably connected with said plurality of shoulder bolts so as to be slidable axially with respect to said primary clutch shaft; and
  clutch electromagnetic coil means comprising a primary electromagnetic coil, said clutch electromagnetic coil means being connected with said stationary housing for magnetically attracting said coil face portion of said clutch armature plate in response to energization of said primary electromagnetic coil;
  wherein said plurality of clutch springs bias said clutch armature plate against said thrust plate, thereby causing said first and second clutch thrust surfaces to bias against said clutch disc stack so as to clamp said first set of annular discs with respect to said second set of annular discs; wherein further, energization of said primary electromagnetic coil magnetically attracts said clutch armature plate so as to relieve said biasing of said thrust plate against said clutch disc stack; and brake means connected with said stationary housing means and said secondary drive means for selectively engaging said secondary drive means with respect to said stationary housing, and, in combination with said clutch means, for selectively engaging said primary drive means with respect to said stationary housing, said brake means comprising:
a brake disk stack comprising:
  a third set of annular disks connected with said secondary drive means so as to rotate with said secondary drive means and be axially slidable with respect thereto;
  a fourth set of annular discs interleaved with said third set of annular disks, said fourth set of annular discs being connected with said stationary housing so as to be nonrotatable therewith and axially slidable with respect thereto; and
  second alignment pin means connected with said fourth set of annular discs for capturing each annular disc of said fourth set of annular discs and for capturing each annular disc of said third set of annular discs; and
second biasing means connected with said stationary housing for selectively biasing said third set of annular discs with respect to said fourth set of annular discs so as to selectively clamp said third set of annular discs with respect to said fourth set of annular discs, thereby selectively engaging said secondary drive means and, selectively through said clutch means, said primary drive means with respect to said stationary housing;
wherein said first and second alignment pin means comprise:
  a plurality of first alignment pins, each first alignment pin of said plurality of first alignment pins having a head at a first end thereof and a threaded opposite end;
  a plurality of first double threaded nuts, a first double threaded nut being threadably engaged on said threaded opposite end of each said first alignment pin;
  a plurality of second alignment pins, each second alignment pin of said plurality second of alignment pins having a head at a first end thereof and a threaded opposite end; and
  a plurality of second double threaded nuts, a second double threaded nut being threadably engaged on said threaded opposite end of each said second alignment pin;
  wherein each annular disc of said second set of annular discs is provided with a plurality of first alignment pin holes, a first alignment pin of said plurality of first alignment pins extending through each first alignment pin hole of said plurality of first alignment pin holes, said first and second sets of annular discs being captured between said head and said double threaded nut of each said first alignment pin;

wherein further, each annular disc of said fourth set of annular discs is provided with a plurality of second alignment pin holes, a second alignment pin of said plurality of second alignment pins extending through each second alignment pin hole of said plurality of second alignment pin holes, said third and fourth sets of annular discs being captured between said head and said double threaded nut of each said second alignment pin;

wherein said clutch means further comprises:
first threaded seat means in said thrust plate for threadably receiving said double threaded nut of each said first alignment pin;

wherein said brake means further comprises:
a brake hub connected with said gear reduction means for rotating with said secondary drive means, said brake hub being provided with splines; and
second threaded seat means in said stationary housing for threadably receiving said double threaded nut of each said second alignment pin;

wherein each annular disc of said third set of annular discs has a third inner periphery and a third outer periphery, wherein further each annular disc of said fourth set of annular discs has a fourth inner periphery and a fourth outer periphery, said third inner periphery having a cross-section less than said fourth inner periphery, said third inner periphery being provided with a plurality of teeth for engaging said splines of said brake hub, said double threaded nuts of each said second alignment pins being threadably received in said threaded seat means.

2. The two speed drive of claim 1, further comprising a plurality of first wave washers wherein each annular disc of said second set of annular discs is separated from each adjacent annular disc of said second set of annular discs by a respective set of first wave washers one first wave washer of said respective set of first wave washers being carried on each said first alignment pin; wherein further, each annular disc of said fourth set of annular discs is separated from each adjacent annular disc of said fourth set of annular discs by a respective set of second wave washers, one second wave washer of said respective set of second wave washers being carried on each second alignment pin.

3. The two-speed drive of claim 2, wherein said second biasing means comprises:
a brake armature plate having a first brake thrust surface for abutably contacting one side of said brake disc stack, said brake armature plate being provided with a coil face portion constructed of a magnetic material;
a second brake thrust surface connected with said stationary housing for abutably contacting a side of said brake disc stack opposite with resect to said one side thereof;
a plurality of brake springs, said stationary housing being provided with a plurality of brake spring cavities for locating a brake spring of said plurality of brake springs in a respective brake spring cavity;
a plurality of shoulder bolts, a shoulder bolt being anchored in each of said brake spring cavities, said armature plate being slidably connected with said plurality of shoulder bolts so as to be slidable axially with respect to said brake hub; and
brake electromagnetic coil means comprising a secondary electromagnetic coil, said brake electromagnetic coil means being connected with said stationary housing for magnetically attracting said coil face portion of said brake armature plate in response to energization of said secondary electromagnetic coil;

wherein said plurality of brake springs bias said brake armature plate against said brake disc stack thereby causing said first and second brake thrust surfaces to bias against said brake disc stack so as to clamp said third set of annular discs with respect to said fourth set of annular discs; wherein further, energization of said secondary electromagnetic coil magnetically attracts said brake armature plate so as to relieve said biasing of said brake armature plate against said brake disc stack.

4. The two-speed drive of claim 3, wherein said secondary drive means comprises a secondary electric motor, said secondary electric motor being electrically wired with respect to said brake electromagnetic coil means so that energization of said secondary motor also effects energization of said secondary electromagnetic coil.

5. The two-speed drive of claim 4, wherein said primary drive means comprises a primary electric motor, said primary electric motor being electrically wired with respect to said clutch electromagnetic coil means so that energization of said primary motor also effects energization of said primary electromagnetic coil.

6. The two speed drive of claim 3, further comprising manual over-ride means connected with said stationary housing for providing selective release of said biasing of said second biasing means with respect to said third and fourth sets of annular discs.

7. The two-speed drive of claim 6, wherein said manual over-ride means comprises:
bolt means rotatably connected with said stationary housing and structured for being rotated externally with respect to said stationary housing by an external force applied to said bolt means; and
a plate of rounded contour eccentrically connected to said bolt means for abutably contacting to said brake armature plate for releasing said biasing by said plurality of brake springs of said brake armature plate against said brake disc stack in response to selective rotation of said bolt means.

8. The two-speed drive of claim 7, wherein said plate is eccentrically connected with said bolt means so that said manual over-ride means automatically restores said biasing of said second biasing means with respect to said first and second sets of annular discs upon a predetermined amount of lessening of application of the external force applied to said bolt means.

9. The two-speed drive of claim 8, wherein said manual over-ride means further comprises crank means connected with said brake hub for providing manual driving of said output shaft while said second biasing means is released in response to said selective rotation of said bolt means.

10. The two-speed drive of claim 6, wherein said secondary drive means comprises a secondary electric motor, said secondary electric motor being electrically wired with respect to said brake electromagnetic coil means so that energization of said secondary motor also effects energization of said secondary electromagnetic coil.

11. The two-speed drive of claim 10, wherein said primary drive means comprises a primary electric motor, said primary electric motor being electrically wired with respect to said clutch electromagnetic coil means so that energization of said primary motor also effects energization of said primary electromagnetic coil.

* * * * *